United States Patent [19]
Boardman et al.

[11] Patent Number: 5,465,243
[45] Date of Patent: Nov. 7, 1995

[54] OPTICAL RECORDER AND READER OF DATA ON LIGHT SENSITIVE MEDIA

[75] Inventors: John D. Boardman, Garland; Scott M. Hamilton; Mervin L. Gangstead, Richardson; Jimmie L. Sadler, Garland; Richard A. Trimble, Rowlett; Jeffrey P. Welch, Plano, all of Tex.

[73] Assignee: E-Systems, Inc., Dallas, Tex.

[21] Appl. No.: 232,596

[22] Filed: Apr. 25, 1994

Related U.S. Application Data

[63] Continuation of Ser. No. 877,535, May 1, 1992, abandoned, which is a continuation-in-part of Ser. No. 873,029, Apr. 24, 1992, Pat. No. 5,216,534.

[51] Int. Cl.6 ........................................... G11B 7/00
[52] U.S. Cl. .................... 369/49; 369/48; 369/54; 369/116; 369/112; 369/44.14; 369/44.18; 369/44.37
[58] Field of Search ................... 369/58, 59, 49, 369/44.18, 44.14, 44.11, 44.37, 44.38, 112, 121, 48, 47, 97, 94, 116, 53, 54, 100, 109, 111

[56] References Cited

U.S. PATENT DOCUMENTS

| | | |
|---|---|---|
| 1,973,203 | 9/1934 | Goldberg . |
| 3,409,348 | 11/1968 | Annis et al. . |
| 3,891,794 | 6/1975 | Russell . |
| 4,090,031 | 5/1978 | Russell . |
| 4,320,488 | 3/1982 | Russell . |
| 4,321,700 | 3/1982 | Russell . |
| 4,426,696 | 1/1984 | Brenden et al. . |
| 4,494,226 | 1/1985 | Hazel et al. ............... 369/58 |
| 4,495,609 | 1/1985 | Russell . |
| 4,609,259 | 9/1986 | Suemitsu et al. . |
| 4,640,573 | 2/1987 | Kataoka et al. . |
| 4,689,291 | 8/1987 | Popovic et al. . |
| 4,737,447 | 4/1988 | Suzuki et al. . |
| 4,815,067 | 3/1989 | Wedster et al. ............ 369/97 |
| 4,958,338 | 9/1990 | Miller ....................... 369/59 |
| 5,081,617 | 1/1992 | Gelbart . |

OTHER PUBLICATIONS

S. Timoshenko, et al., *Theory of Elasticity*, pp. 69–73 (2nd Ed., 1951).
P. Cheo, *Fiberoptics Devices and Systems*, pp. 254–272 (1985).
M. Mansuripur, *Analysis of Astigmatic Focusing and Push–Pull Tracking Error Signals in Magnetooptical Disk Systems*, Applied Optics vol. 26, No. 18, Sep. 15, 1987.
"Optical Glass", product brochure from Schott Glass Technologies, Inc., dated 1987.
D. Begley, et al., *Aperture Shared Laser Diode Array Beam Combiner*, Applied Optics vol. 27, No. 13, Jul. 1, 1988.
K. Flood, et al., *Multiple Phase Level Computer–Generated Holograms Etched in Fused Silica*, SPIE vol. 1052, Holographic Optics; Optically and Computer Generated (1989).
S. R. Perera, et al., *Flexible Optical Drive Technology*, SPIE vol. 1078, Optical Data Storage Topical Meeting (1989).
D. Buralli, et al., *Optical Performance of Holographic Kinoforms*, Applied Optics vol. 28, No. 5, Mar. 1, 1989.
J. Jahns, et al., *Two–Dimensional Array of Diffractive Microlenses Fabricated by Thin Film Deposition*, Applied Optics vol. 29, No. 7, Mar. 1, 1990.

Primary Examiner—Scott J. Sugarman
Assistant Examiner—Muhammad N. Edun
Attorney, Agent, or Firm—Harold E. Meier

[57] ABSTRACT

The optical tape recorder of the present invention is capable of archiving data at rates in excess of 400 megabits per second by concurrently writing or reading a plurality data tracks in each data trace. A read-write module outputs an illumination beam comprised of combined multiple write beams (channels), a read beam and an autofocus beam. Optics within the read-write module spatially combine and accurately position the plurality of beams with respect to each other to form the multi-beam illumination beam. A read-write head comprised of a synchronized scanning transmissive polygon and rotating lens wheel scans the multi-beam illumination beam across a recording media to read or write multi-channel data tracks. An autofocus system is also included to ensure that the multi-beam illumination beam is accurately focused on the recording media.

24 Claims, 7 Drawing Sheets

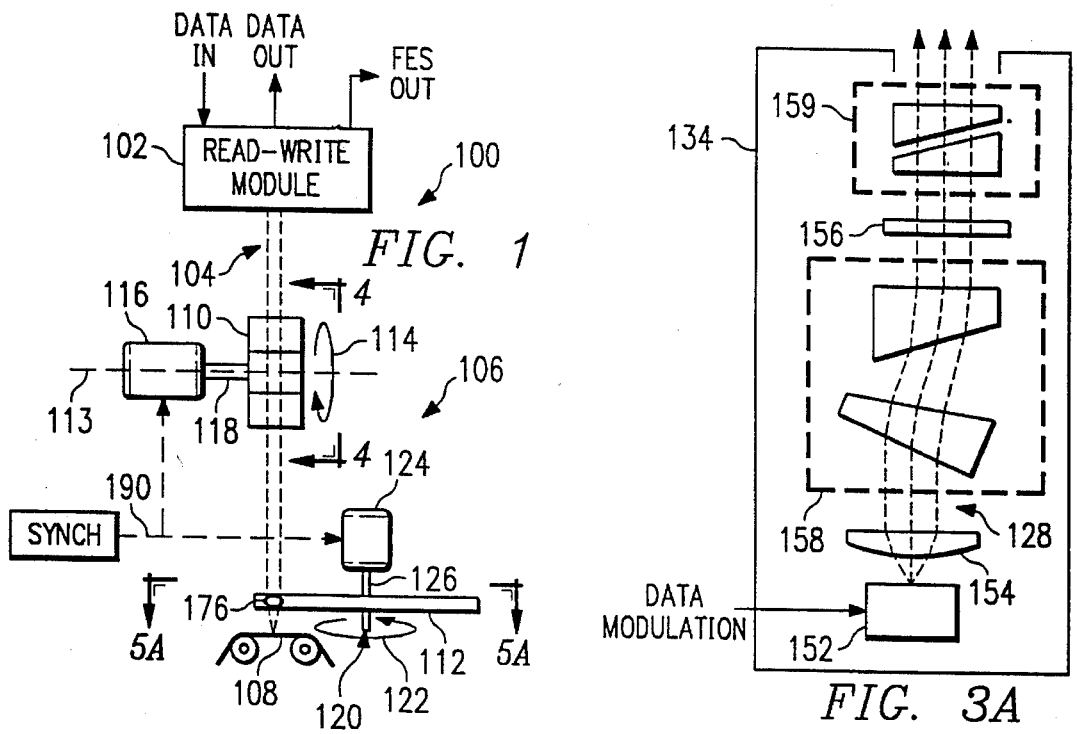
FIG. 1
FIG. 3A
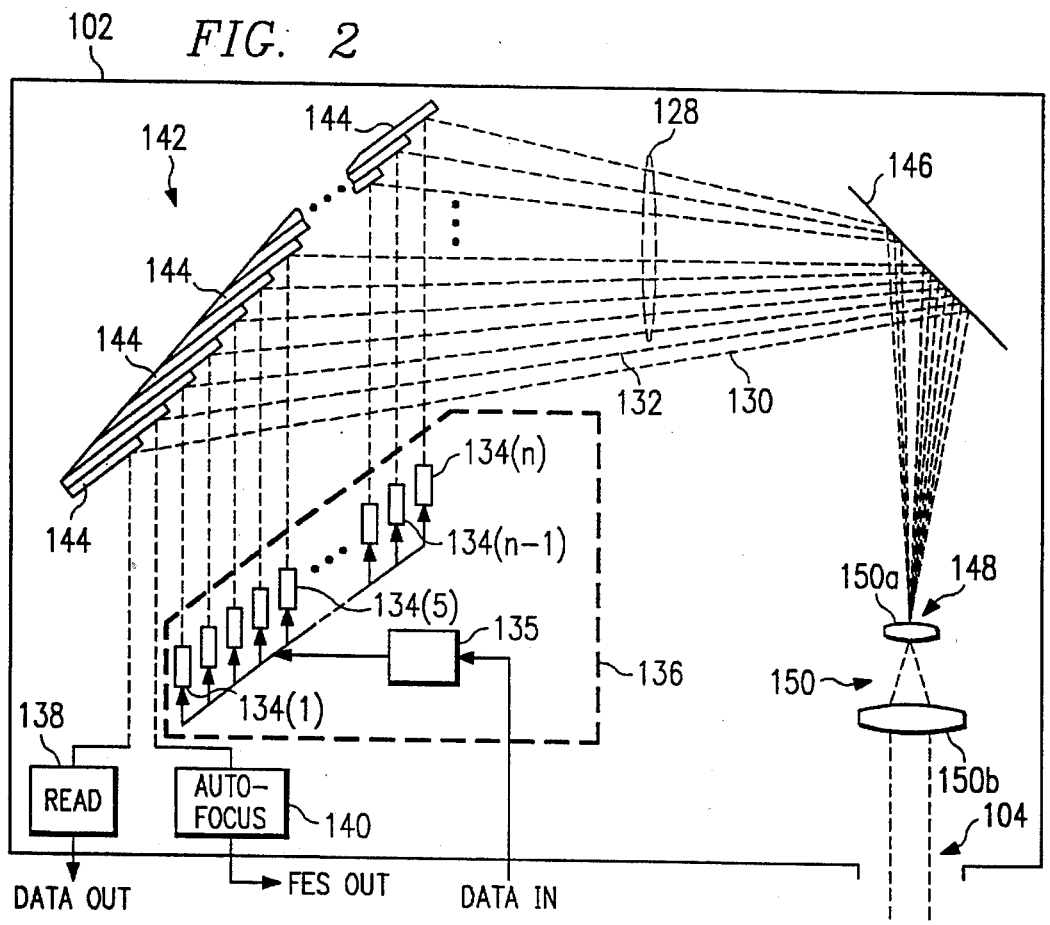
FIG. 2

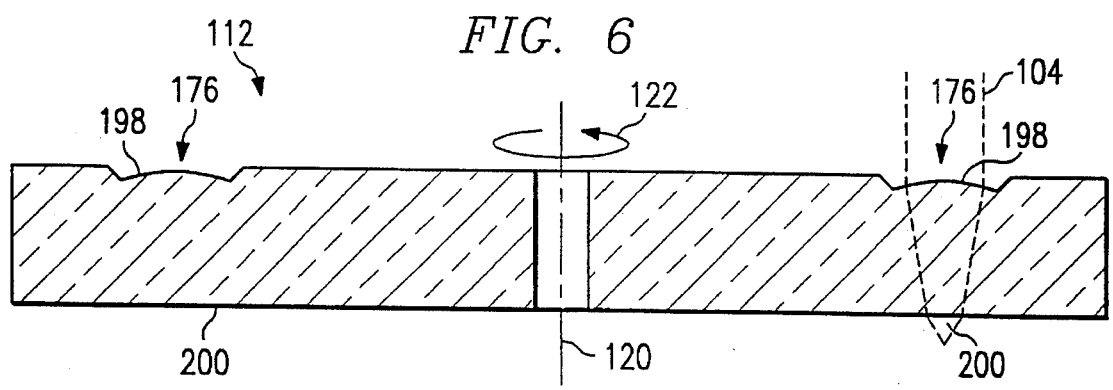
FIG. 6
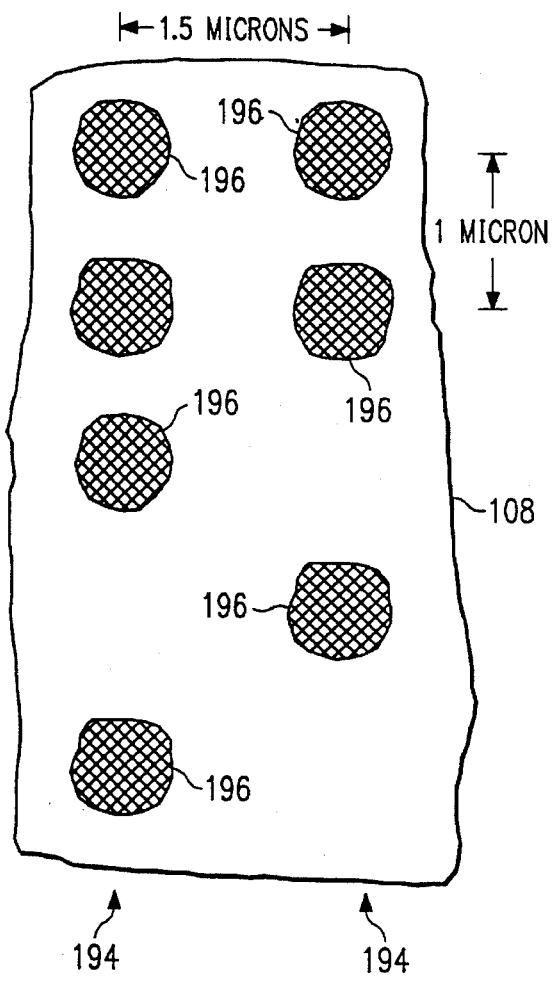
FIG. 5D
FIG. 7

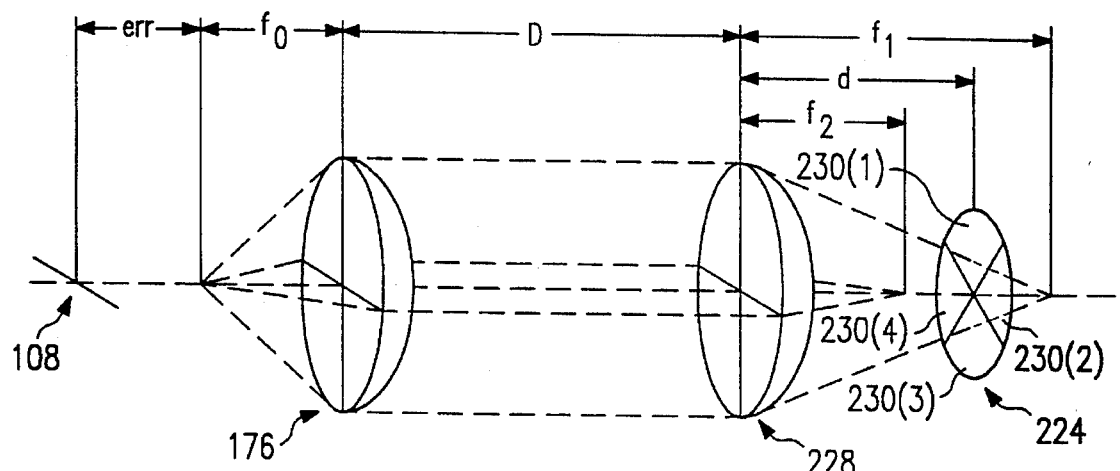
FIG. 10
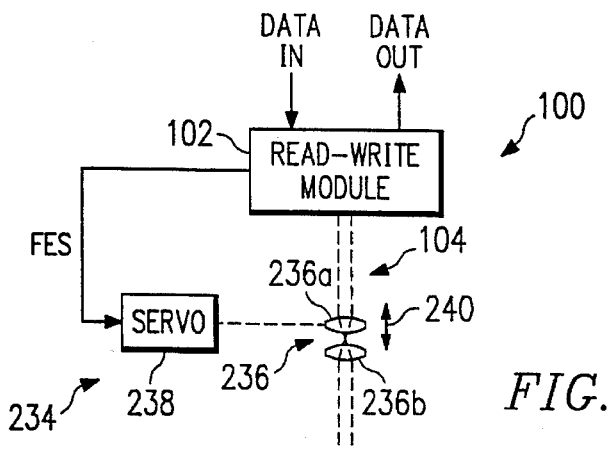
FIG. 11A
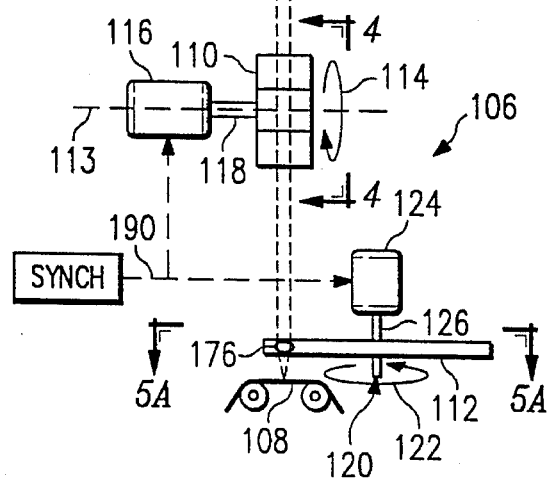

OPTICAL RECORDER AND READER OF DATA ON LIGHT SENSITIVE MEDIA

This application is a continuation of application Ser. No. 07/877,535, filed May 1, 1992, now abandoned, which is a continuation-in-part of application Ser. No. 07/873,029 filed on Apr. 24, 1992, now U.S. Pat. No. 5,216,534 issued Jun. 1, 1993.

TECHNICAL FIELD

The present invention relates to optical tape recorders and, in particular, to an optical tape recorder for archiving and retrieving data at rates in excess of 400 megabits per second.

BACKGROUND OF THE INVENTION

Magnetic tape recording systems are widely used to archive digital information, but have historically been plagued by performance and storage problems that render their continued use for high volume information storage unacceptable. For example, due to the relatively low storage density of the magnetic recording media, a large number of expensive tape reels or cassettes are required to store the information. Furthermore, the mechanical devices and parts used in providing a storage system for the reels and cassettes of recorded media often require expensive and time consuming maintenance and/or complete replacement. The magnetic tapes must also be repacked every six months to account for tape stretch and rerecorded every five to ten years in order to preserve data integrity.

Optical systems are now commonly used in place of magnetic systems for recording and playback of digitized information. In optical recorders, the data is used to amplitude modulate a light beam having a predetermined intensity necessary to mark a light sensitive recording media. The modulated beam is focused to a small spot and traced across the media to record the data as a fine optical pattern comprised of a number of closely spaced, microscopic dots (data marks) along a data track. To recover the recorded data from the optical media, a low intensity illumination beam is scanned along the data track and modulated by the optical pattern recorded therein. The modulated beam is reflected from the media to illuminate a light detector producing an electrical signal in accordance with the beam modulation for recovery of the recorded data.

Optical recording and playback systems have proven to provide enhanced performance characteristics over magnetic systems. The microscopic optical pattern of data recorded on the recording media by an optical system dramatically increases the data storage density over conventional magnetic systems. Furthermore, there is a decreased susceptibility to tape stretch and wear with optical playback systems because, unlike magnetic systems, there is active optical tracking during the reading process with no contact between the read head and the media. Accordingly, data life on the media is increased to over twenty years. Finally, because significantly more data can be stored by optical systems, the complexity of an archiving system (and required space) for storing recording media reels and cassettes is significantly reduced.

The problem with present optical recording and playback system technology, however, is low record and playback data rates. Currently available "high speed" optical recording systems provide only a three megabyte (twenty-four megabits) per second record or read rate. At that rate, it would take nearly four full days to record or playback one terabyte of digital data. For current and future needs, record and playback rates on the order of three megabytes per second are unacceptably slow. The National Aeronautics and Space Administration, for example, anticipates a data rate of 500 megabits per second by the year 2000 for the Deep Space Network. This is far too much data, on the order of a five terabyte per day archive rate, for conventional optical systems to handle. Accordingly, there is a need for an improved optical data storage and playback apparatus capable of handling data input and output rates in excess of 400 megabits per second.

SUMMARY OF THE INVENTION

Conventional optical recording and playback systems amplitude modulate a single beam of light with digital data to record at a rate of approximately twenty-four megabits per second. The optical tape recorder of the present invention is capable of archiving and retrieving data at rates in excess of 400 megabits per second by concurrently writing and/or reading a plurality of data tracks in each data trace scanned across the light sensitive recording media. Each of the data tracks (channels) with a multi-channel data trace records a different predetermined portion of the data. Thus, the effective read or write rate is increased over conventional systems by a factor equivalent to the number of data tracks combined and concurrently written or read in each multi-channel data trace. This multi-channel read and write scheme provides enhanced data capacity performance over conventional magnetic and single channel optical systems.

To achieve a multiple data track per data trace record and read, the optical recorder of the present invention utilizes a read-write module that outputs a multi-beam illumination beam for the data trace including: a multi-channel write beam to record multiple data tracks in each data trace; a read beam that scans the multi-channel data trace to recover the multiple data tracks of recorded data; and an autofocus beam to assist in focusing the multi-channel write beam and read beam combined within the multi-beam illumination beam on the surface of the recording media. Recording and reading multiple data tracks per data trace requires accurate combination of the multiple write, read and autofocus beams into the multi-beam illumination beam for scanning across the media. To accomplish this combination, the read-write module includes spatial combining optics and pointing and translating optics to deflect the beams together and accurately position and orient the multiple write, read and autofocus beams with respect to each other, thereby ensuring proper alignment within the illumination beam. The optics of the read-write module further adjust and separate the individual write, read and autofocus beams within the illumination beam to provide accuracy and efficiency in archiving and retrieving data at high rates.

BRIEF DESCRIPTION OF THE DRAWINGS

A more complete understanding of the optical tape recorder of the present invention may be had by reference to the following Detailed Description in conjunction with the accompanying Drawings wherein:

FIG. 1 illustrates an optical tape recorder system according to the present invention;

FIG. 2 is a schematic diagram of the read-write the spatial combination of the multiple write, read and autofocus beams into a multi-beam illumination beam;

FIG. 3A is a schematic diagram of a single polarization embodiment of the write beam source for the read-write module shown in FIG. 2;

FIG. 5D illustrates the spacing between adjacent data tracks in the data trace and the spacing between adjacent data marks in each data track;

FIG. 6 is a cross sectional view of a unitary lens wheel;

FIG. 7 is a schematic diagram of the recorder shown in FIG. 1 including a pair of opposed beam expanders positioned on opposite sides of the scanning transmissive polygon in the read-write head of the present invention;

FIG. 10 illustrates the astigmatic focus error correction geometry utilized by the autofocus error detector shown in FIG. 9 to detect focusing errors in the optical tape recorder shown in FIG. 1;

FIG. 11A illustrates one embodiment of the optics for the autofocus system included in the optical tape recorder of FIG. 1;

DETAILED DESCRIPTION OF THE DRAWINGS

Figure 3B:
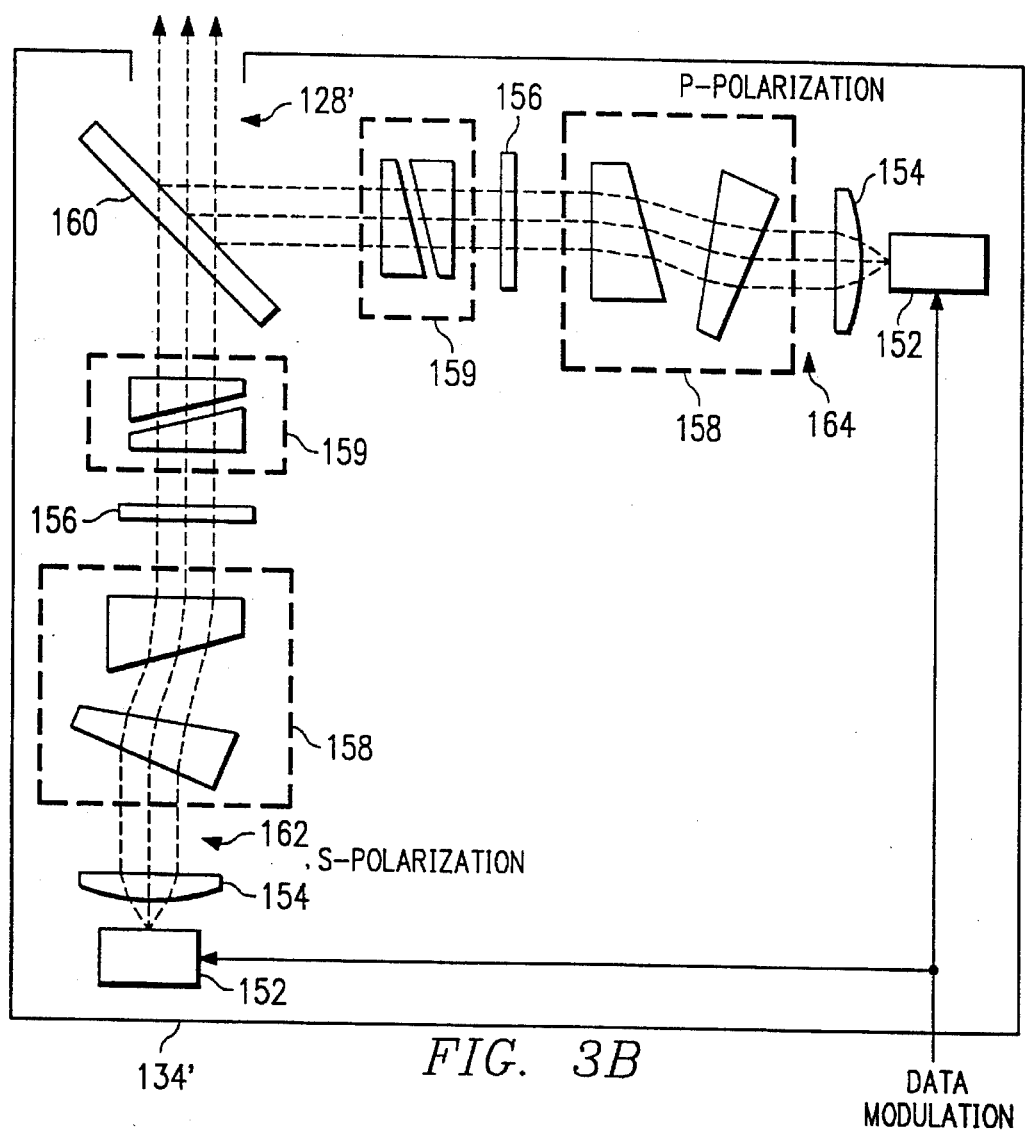
FIG. 3B is a schematic diagram of a multi-polarization embodiment of the write beam source for the read-write module shown in FIG. 2.

Referring now to FIG. 1, there is shown a schematic diagram of an optical tape recorder 100 according to the present invention. The recorder 100 comprises a read-write module 102 outputting an multi-beam illumination beam 104 and a read-write head 106 for focusing the multi-beam illumination beam on a recording media 108 that is sensitive to light. The multi-beam illumination beam 104 may include either or both a write beam and a read beam. The multi-beam illumination beam 104 may also include other beams, such as an autofocus beam, combined with the read and write beam as needed to perform the desired functions of the recorder 100. As will be discussed below, the read-write module 102 includes light sources and optics (see FIGS. 2, 3A, 3B, 8 and 9) for generating and combining the included multi-channel write, read and autofocus beams into the multi-beam illumination beam 104.

For purposes of either writing data to or reading data from the recording media 108, the multi-beam illumination beam 104 output by the read-write module 102 is directed toward the read-write head 106 comprised of a synchronized scanning transmissive polygon 110 and rotating lens wheel 112. The scanning transmissive polygon 110 is rotated about an axis of rotation 113 in the direction indicated by arrow 114 by a motor 116 turning a shaft 118 mounted to the polygon. The lens wheel 112 is rotated about its axis of rotation 120, in the direction indicated by arrow 122, by a motor 124 turning a shaft 126 mounted to the lens wheel. The polygon 110 and lens wheel 112 of the read-write head function in combination to accurately focus and scan the multi-beam illumination beam 104 across the recording media 108 to provide, in a manner to be described, a multiple data track data trace.

Conventional optical storage devices include only a single write beam that is focused and scanned across the recording media by a read-write head to record the data as a fine optical pattern, commonly referred to as a data track, comprised of a single line (channel) of closely spaced, microscopic dots (data marks). To increase the record and read data rates significantly over the rates provided by the conventional single channel system, the read-write module 102 of the present invention outputs a multi-beam illumination beam 104 having a plurality of write beams combined together. This illumination beam 104 is focused and scanned across the recording media 108 by the read-write head 106 to record the data in a fine optical pattern (data trace) comprised of multiple data tracks (channels) of closely spaced, microscopic dots (data marks) as will be described in more detail with respect to FIGS. 5C and 5D. By enabling the recorder 100 of the present invention to record multiple data tracks in each data trace scanned across the recording media, the rate for archiving and retrieving data is significantly increased over conventional single channel recorders (by at least a factor of n where n equals the number data tracks recorded in each data trace).

Referring now to FIG. 2, there is shown a schematic diagram of the read-write module 102 for the optical recorder 100 of the present invention. The multi-beam illumination beam 104 output by the read-write module 102 comprises a plurality of spatially combined beams, including a plurality of collimated write beams 128, a collimated read beam 130 and a collimated autofocus beam 132. Each collimated write beam 128 is output by a write beam source 134 (see FIGS. 3A and 3B) amplitude modulated by a predetermined portion of the data to be recorded. The plurality of write beam sources and means 135 for modulating the sources in response to the predetermined portion of the data to be recorded comprise a write sub-module 136 for the read-write module 102. The collimated read beam 130 and collimated autofocus beam 132 are similarly output from a read beam source and an autofocus beam source (not shown, see FIGS. 8 and 9) included in a read sub-module 138 and autofocus sub-module 140, respectively, for the read-write module 102.

The read-write module 102 further includes spatial combining optics for combining the plurality of write beams 128, read beam 130 and autofocus beam 132 to form the multi-beam illumination beam 104. The collimated beams (128, 130 and 132) output by the write, read and autofocus sub-modules (136, 138 and 140, respectively) are reflected by a multi-pane, layered reflector 142 having a plurality of offset, layered pane mirrors 144. The beams reflected by the layered reflector 0142 are further reflected by a single pane mirror 146. The angles of reflection for the panes of the layered reflector 142 and the single pane mirror 146 are chosen to deflect and spatially combine the reflected plurality of write beams 128, read beam 130 and autofocus beam 132 to converge at a point 148. A two lens system 150, comprised of an objective lens 150a positioned at the point 148 and a collimating lens 150b, projects the multi-beam illumination beam 104, comprised of the spatially combined write beams 128, read beam 130 and autofocus beam 132, from the read-write module 102.

Referring now to FIG. 3A, there is shown a schematic diagram of a single-polarization embodiment of the write beam source 134 utilized in the write sub-module 136 of the read-write module 102. A laser diode 152 of a predetermined polarization and wavelength outputs light that is collimated by a lens 154 into a collimated write beam 128. The write beam 128, as output from the write beam source 134, is spatially combined with the write beams output from the other write beam sources 134(n) of the write sub-module 136, the read beam 130 and the autofocus beam 132. The position of the write beam 128, as output from the write beam source 134, within the multi-beam illumination beam 104 is circularized by an anamorphic prism pair 158, translated by an adjustable displacement plate 156 and pointed by an adjustable risley prism pair 159 to accurately position and orient the beam with respect to the other included beams (read, write and autofocus) to ensure proper alignment and separation of the multiple beams within the multi-beam illumination beam.

Referring now to FIG. 3B, there is shown a schematic diagram view of a multi-polarization embodiment of the write beam source 134' utilized in the write sub-module 136 of the read-write module 102. The multi-polarization embodiment of the write beam source 134' utilizes a dielectric polarizer 160 (that through transmits s-polarized light and reflects p-polarized light) to combine an s-polarized collimated write beam 162 channel with a p-polarized collimated write beam 164 channel emitted by laser diodes 152 of nearly equal wavelength to output a combined polarization collimated write beam 128'. With the polarization combined write beam source 134' the output power of the write beam 128' is significantly increased. Each polarization channel utilizes an anamorphic prism pair 158 to circularize the beam, an adjustable displacement plate 156 for translating the beam and an adjustable risley prism pair 159 for pointing the beam to accurately position the s- and p-polarized beams, 162 and 164, respectively, at the dielectric polarizer 160. The displacement plate 156 and risley prism pair 159 also function to accurately position and orient the write beam 128', as output by the write beam source 134', with respect to the other write beams 128', read beam 130 and autofocus beam 132 to ensure proper alignment and separation within the multi-beam illumination beam 104.

Figure 4:
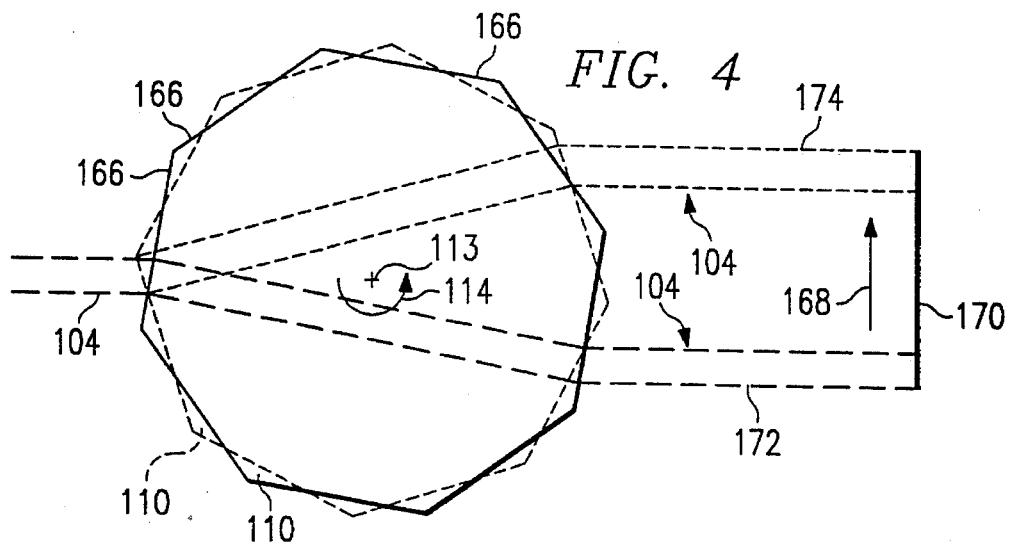
FIG. 4 is a schematic diagram of the scanning transmissive polygon of the read-write head for the optical tape recorder shown in FIG. 1 showing the displacement and translation of the multi-beam illumination beam comprised of the multiple read, write and autofocus beams.

As shown in FIG. 1, the multi-beam illumination beam 104, including the multiple collimated write beams 128 emitted from the read-write module 102, is directed toward the scanning transmissive polygon 110 of the read-write head 106. Referring now to FIG. 4, there is shown a schematic diagram of the scanning transmissive polygon 110. The polygon 110 is comprised of a piece of optical quality transparent material having an even number of sides 166 arranged in opposed parallel pairs. The polygon 110 is positioned to receive the multi-beam illumination beam 104 so that the beam is transmitted through the polygon and refracted by one of the opposed pairs of parallel sides 166. The refracted beam is thus displaced without changing the direction of (i.e., parallel to) the collimated beam 104 received by and transmitted through the polygon 110.

Figure 5A:
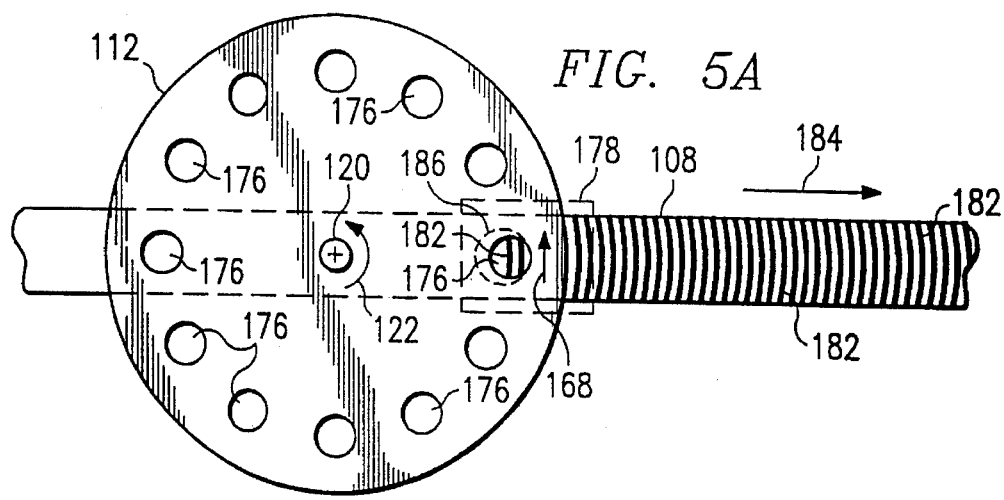
FIG. 5A illustrates the lens wheel of the read-write head shown in FIG. 1.
Figure 5B:
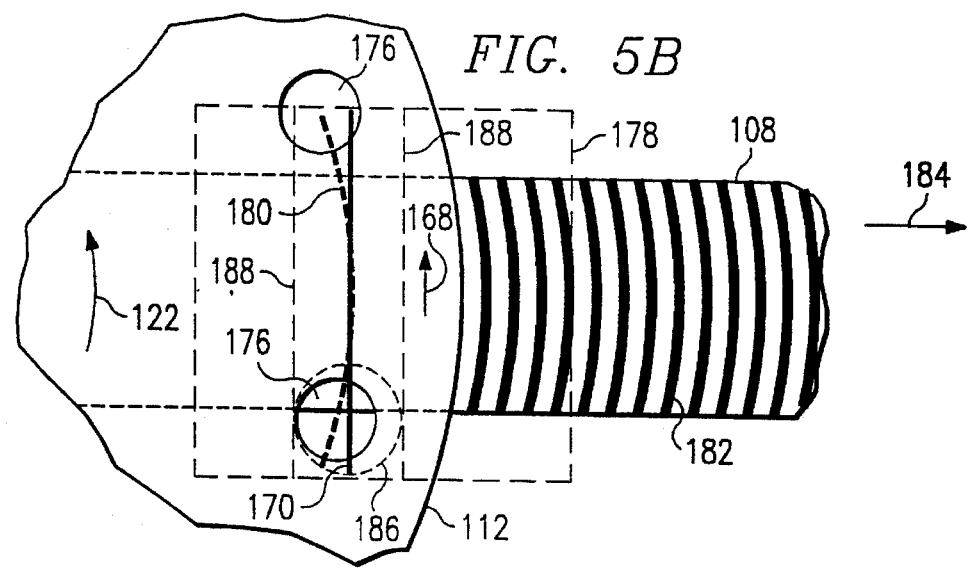
FIG. 5B is a close-up illustration of a portion of the lens wheel as in FIG. 5A showing the synchronized paths of movement of the translated illumination beam and lenses on the rotating lens wheel.

Rotation of the polygon 110 about axis 113 (in the direction shown by arrow 114) causes the through transmitted and displaced multi-beam illumination beam 104 to translate and repeatedly scan, in the direction indicated by arrow 168, along a linear path 170 (shown also in detail as a solid line in FIG. 5B). The displaced multi-beam illumination beam 104 will scan, as the polygon 110 rotates, along path 170 from a first position, generally indicated by the output beam 172 for the solid line polygon, to a second position, generally indicated by the output beam 174 for the dashed line polygon. One scan of the beam along the path 170 occurs for each opposed pair of parallel sides 166 refracting the through transmitted multi-beam illumination beam 104 as the polygon 110 rotates.

Referring again to FIG. 1, the through transmitted and displaced scanning multi-beam illumination beam 104 is directed toward the rotating lens wheel 112. Referring now to FIG. 5A, there is shown an illustration of the lens wheel 112 of the present invention. The lens wheel 112 has a disk shape and comprises a plurality of individual lenses 176 positioned with equal spacing about the circumference of the disc. The individual lenses 176 successively receive and focus the multi-beam illumination beam 104 onto the recording media 108. The lens wheel is preferably a unitarily formed disk-shaped piece of optical quality material having the plurality of lenses 176 precision molded or diamond point turned therein. Each lens 176 may alternatively be manufactured individually, separate and apart from the lens wheel 112, and inserted and secured within a plurality of openings formed about the circumference of the lens wheel disc. Separate manufacture and installation of individual lenses 176 is not preferred, however, as the unitary lens wheel 112 described above more accurately performs and may be manufactured less expensively and reproduced more consistently.

As the lens wheel 112 is rotated about its center 120 by the motor 124 (FIG. 1), successive individual lenses 176 about the circumference of the wheel momentarily receive and focus the multi-beam illumination beam 104 on the recording media 108. Focusing of the multi-beam illumination beam 104 by a lens 176 occurs only when the lens momentarily moves through an active area 178 on the lens wheel 112 generally corresponding to the location of the recording media 108 and the area where the multi-beam illumination beam 104 illuminates the lens wheel. Rotation of the lens wheel 112 in the direction shown by arrow 122 causes successive individual lenses 176 to follow an arcuate path 180 (shown in detail as a broken line in FIG. 5B) through the active area 178. The path 180 consists of a portion of the circumferential path within the active area 178 followed by the center of each lens 176 as the lens wheel 112 rotates. Each lens 176 passing through the active area 178 receives and focuses the incident multi-beam illumination beam 104 onto the recording media 108 to scan a data trace 182 across the width of the media. With movement of the recording media 108 in a direction (shown by arrow 184) perpendicular to the direction of the trace 182 and rotation of the lens wheel 112 (shown by arrow 122), successive lenses 176 become active to scan out successive parallel and adjacent data traces across the recording media.

The linear path 170 followed by the scanning multi-beam illumination beam 104 and arcuate path 180 followed by each lens 176 on the rotating lens wheel 112 through the active area 178 are shown superimposed over each other in FIG. 5B. The multi-beam illumination beam 104 (shown illuminating a circular area 186 on the lens wheel that is slightly larger than the diameter of a lens 176) illuminates a portion of the active area 178, while scanning along path 170, between the broken lines 188. Full illumination of each successive lens 176 moving along path 180 by the scanning of the multi-beam illumination beam 104 along path 170 to scan successive parallel data traces 182 first requires that the position of the paths be substantially aligned (as shown in FIG. 5B). A slight deviation between the paths as shown caused by the lens path 180 being arcuate and the scan path 170 being linear is permissible due to the size of the area between lines 188 that will be illuminated.

Referring now to FIGS. 1, 4, 5A and 5B, full illumination of each successive lens 176 further requires that the movement of each scan of the multi-beam illumination beam 104 along path 170 be synchronized to coincide with the movement of each successive lens along path 180 through the active area 178. With synchronization, the circular area 186 illuminated on the lens wheel 112 will fully illuminate each lens 176 as the lens moves through the active area 178 thereby achieving the smallest possible bit diameter on the recording media 108 as possible for each of the multiple data tracks recorded in each data trace 182 as will be described. To achieve full illumination, the actuation of the motors 116 and 124 for the polygon 110 and lens wheel 112, respectively, are controlled for synchronization, as generally indicated at 190, such that one scan of the multi-beam illumination beam 104 along linear path 170 will occur for and correspond with the movement of each lens 176 through the active area 178 along arcuate path 180.

Figure 5C:
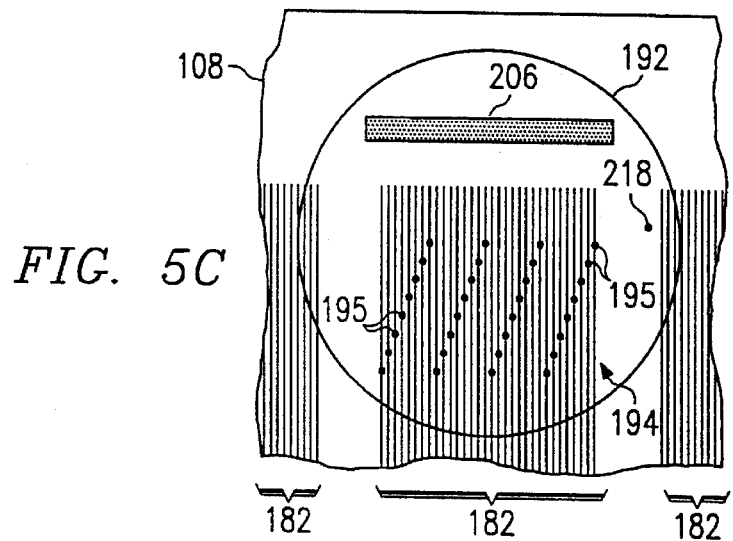
FIG. 5C illustrates the field of view of one lens of the lens wheel wherein the multiple write, read and autofocus beams of the multi-beam illumination beam are focused on the recording media along a data trace.

Referring now to FIG. 5C, there is shown the field of view 192 of the multi-beam illumination beam 104 as focused on the recording media 108 by a lens 176 of the lens wheel 112. As discussed above with respect to FIG. 2, in order to provide the increased archive and retrieval data rates for the optical recorder 100 of the present invention, the multi-beam illumination beam 104 includes a multi-channel write beam 128 output by the n write sources 134(*n*) in the write sub-module 136. Thus, each data trace 182 on the recording media 108 will be comprised of n channels of recorded data. Each channel of data is recorded on the recording media 108 as a data track 194 (see also FIG. 5D) within the data trace 182. The position of each write beam 128 within the multi-beam illumination beam 104 is controlled by the pointing and translating optics (see FIGS. 3A and 3B) such that the multiple channels are separated from each other to illuminate separate and distinct write spots 195 within the field of view 192 as focused on the recording media 108. As shown, there are thirty-two write spots corresponding to the n=32 write sources 134 and data channels in the write sub-module 136. The permissible number of write sources 134(*n*) included in the optical recorder 100 is limited by the chosen size of the field of view 192 and the accuracy of the spatial combining optics shown in FIG. 2.

Referring now to FIG. 5D, there is illustrated a piece of recording media 108, within a portion of a data track 182 as shown in FIG. 5C, illustrating the marking of the light sensitive media by the multiple write beams 128 of the focused multi-beam illumination beam 104 to record the data. Portions of two data tracks 194 within a data trace 182 are shown. The spacing between the centers of adjacent data tracks 194 in a data trace 182 is approximately one and a half microns with the centers of adjacent data marks 196 within a data track 194 separated by approximately one micron. Referring again to FIGS. 3A, 3B and 5C, the displacement plate 156 and risley prism pair 158 are adjusted for each write beam source 134 to translate and point each write beam 128 for accurate positioning and orientation of the plurality of collimated beams with respect to each other within the multi-beam illumination beam 104 as projected within the field of view 192 on the recording media 108. Proper translation and pointing ensures an approximate one and a half micron spacing between adjacent data tracks 194. The modulation of the write sources 134 by the data to be recorded is also regulated, in accordance with the predetermined rotational velocity of the lens wheel 112, to maintain proper one micron (approximate) spacing between adjacent data marks 196 in a data track 194. Adjustment of the spacing between adjacent data tracks 194 and adjacent data marks 196 in the manner indicated maximizes data storage density while maintaining system data recording and recovery accuracy.

Referring now to FIGS. 1-5D, to record data on the recording media 108, the intensity of the collimated write beams 128 output by the write sub-module 136 is adjusted such that the beam will mark the light sensitive media. Each write beam 128 is amplitude modulated (on/off) according to the means 135 by a predetermined portion of the data, carried by a data signal, to be recorded. The plurality of write beams 128 are spatially combined within the read-write module 102 to form the multi-beam illumination beam 104, translated by the scanning polygon 110 and focused on the media by the lenses 176 of the rotating lens wheel 112 to scan multiple data tracks 194 within each data trace 182. Translation of the media in a direction (shown by arrow 184) perpendicular to the rotation of the lens wheel 112 allows a plurality of data traces 182 to be recorded adjacent to each other on the media 108.

For example, the lens wheel 112 may include twelve lenses 176 and be rotated at 6,500 revolutions per minute. This results in a scan of 1,300 lenses 176 across a ¾ inch wide tape 108 every second. Assuming a one micron spacing between adjacent marks 196, if one channel (data track 194) of data is written per data trace 182 (as in the prior art conventional optical recorder), 19,000 unformatted data samples will be written across the tape media 108 in each data track. This is equivalent to an unformatted twenty-four megabit per second archive rate. With the multi-channel recording capability of the optical recorder 100 of the present invention, a thirty-two (n=32) channel (data track 194) per data trace 182 write beam 128(*n*) (as shown in FIG. 5C) is provided resulting in an unformatted archive rate in excess of 760 megabits per second. This archive rate will easily satisfy the design goal of a 400 megabyte per second archive rate required for handling current and future data recording needs.

Referring now to FIG. 6, there is shown a cross-sectional view of the unitary lens wheel 112 having a plurality of precision molded or diamond point turned lenses 176 positioned about the circumference of a disk-shaped body. The preferred optical lens design for each lens 176 in the lens wheel 112 is a plano-convex singlet having an aspheric figure on the convex side 198. The use of a plano surface 200 in conjunction with a convex powered surface 198 provides for a less complex lens design by removing the alignment tolerances associated with centering two powered surfaces together (as in a double-convex or concave-convex design). The plano-convex design is further preferred because the design minimizes the wedge between included optical surfaces in the lens and the plano surface provides a useful reference flat. Thus, the plano-convex design using a convex surface 198 coupled to a plano surface 200 provides for easier, less expensive and more efficient fabrication, testing and assembly of the lens wheel 112.

With a lens design where one surface (the aspheric surface 198) provides the majority of the focusing power, an optical material with a refractive index exceeding 2.25 (for example, "Cleartran" zinc sulfide) is preferably used for fabricating each lens 176. In the preferred embodiment, the entire lens wheel 112 (as shown in FIG. 6), including the disc support structure and the individual lenses, is unitarily fabricated from the highly refractive optical quality material using precision molding or diamond point turning techniques. Precision molding of the individual lenses 176 with the disk substrate of the lens wheel forms a unitary lens wheel 112 possessing the advantages of being consistently accurate, easily reproducible and interchangeable. In the alternative, after individual fabrication of each lens 176 from the preferred optical material, the lenses are inserted and secured in one of a plurality of openings around the circumference of the disk-shaped lens wheel 112 in accordance with the teachings of the prior art.

As mentioned above, the lens wheel 112 used in the read-write head 106 has a disk shape unitarily formed from an optical quality material using precision molding or diamond point turning techniques. If precision molding techniques are employed, a master lens wheel that is essentially a negative of the optical surface desired on the lens wheel is used to form the lens wheel. To fabricate the lens wheel 112 from the master, a high quality optical polymer or specially formulated glass is precision molded in accordance with the shape of the master. In the alternative, a flat high quality optical substrate serves as a base for deposition of a thin epoxy layer, with the master molding the lenses into the epoxy to fabricate the wheel.

If refractive optics are to be used for each individual lens 176 on the lens wheel 112, the master is created using conventional diamond turning and polishing techniques. If diffractive optics are to be used, either lithography or diamond turning are used to create the master. Diffractive lenses are typically modelled and fabricated as either kinoforms or binary lenses. A fresnel lens is a specific type of kinoform. The smooth surfaces of kinoforms are approximated using flat surfaces and step functions (binary optics). Flat surface approximated kinoforms are manufactured using diamond turning techniques. Binary optics are manufactured using either photolithography or electron beam lithography by iteratively masking and etching a substrate. Once the lens type (refractive or diffractive) and manufacturing method are determined, the master is fabricated according to the preferred method. A plurality of lens wheels are then manufactured from the master using precision molding with the resulting lens wheels being identical, interchangeable and functional over a broad wavelength range. The lenses will also have substantially identical back focal distances, and any aberrations due to lens design are consistently present across all lenses on the wheel.

Referring again to FIG. 4, for several mechanical and optical performance optimization reasons discussed below, the number of opposed pairs of sides 166 for the polygon 110 should be maximized (as a function of resulting increases in manufacturing complexity and cost). One benefit obtained from increasing the number of opposed sides 166 is that the polygon 110 more closely resembles a disk thereby decreasing the effects of windage as the polygon rotates. Furthermore, an increase in the number of opposed sides 166 decreases the rotational velocity of the polygon 110 required for a fixed rotational speed of the lens wheel 112. This is important because high rotational velocities for the polygon 110 load the motor 116 and induce optical birefringence in some optical materials chosen for fabrication of the polygon. Finally, increasing the number of opposed sides 166 of the polygon 110 decreases the maximum angle of incidence of the multi-beam illumination beam 104. This reduces variations in fresnel reflection coefficients and enables the use of both s- and p-polarized light for the multi-beam illumination beam 104 to increase recorder bandwidth (see, for example, the multi-polarization write beam in FIG. 3B).

Referring now to FIG. 7, the read-write head 106 for the optical tape recorder 100 of the present invention (see FIG. 1) is shown further including a pair of beam expanders 202 positioned along the multi-beam illumination beam 104 on each side of the scanning transmissive polygon 110. Beam expander 202a is located between the scanning polygon 110 and the read-write module 102. Beam expander 202b is located between the scanning polygon 110 and the lens wheel 112. The use of a pair of beam expanders 202 provides a demagnification-magnification system around the polygon 110 that narrows the diameter of the multi-beam illumination beam 104 incident on and transmitted through the polygon and expands the diameter of the beam output from the polygon.

With a smaller diameter multi-beam illumination beam 104 transmitted through the polygon, the size and shape of the polygon may be scaled as desired in accordance with manufacturing complexity and cost concerns while realizing the mechanical and optical performance benefits of an increased number of sides 166 as discussed above. An additional benefit from scaling the size of the polygon 110 is a less stringent manufacturing specification for the parallelism of opposing sides 166 causing a corresponding decrease in polygon manufacturing costs. Furthermore, by narrowing the diameter of the multi-beam illumination beam 104 transmitted through the scanning polygon 110, the duty cycle of the system is increased.

Figure 8:
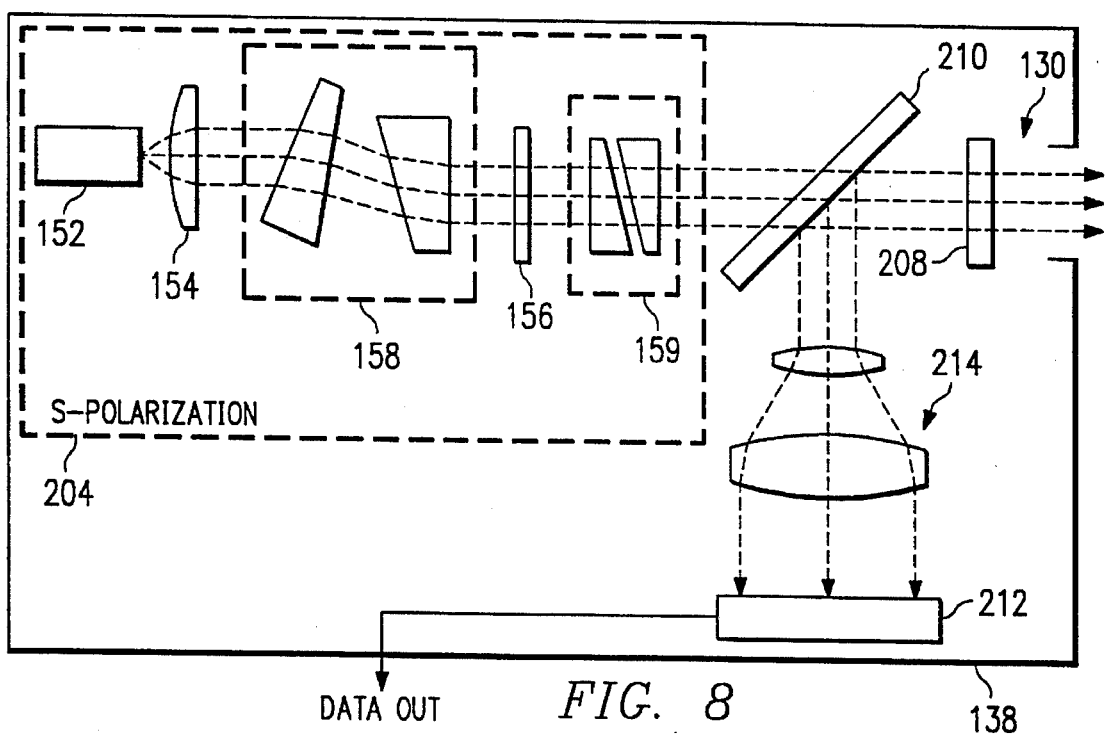
FIG. 8 is a schematic diagram of the read beam source and read array detector for the read-write module shown in FIG. 2.

Referring now to FIG. 8, there is shown a schematic view of the read sub-module 138 within the read-write module 102. The read sub-module includes a read source 204 (similar to the write source 134 shown in FIG. 3A) for outputting a collimated read beam 130. The read source 204 includes an anamorphic prism pair 158, a displacement plate 156 and risley prism pair 159 for shaping, translating and pointing the read beam 130 output by a laser diode 154 and collimated by a lens 154. In particular, the anamorphic prism pair 158 shapes the read beam 130 forming a rectangular illumination field 206 within the field of view 192 as focused on the media 108 (see FIG. 5C) to illuminate across the multiple data tracks 184 (channels) of a recorded data trace 182. The pointing and translating optics of the read source 204 also function to accurately position and orient the read beam 130 with respect to the multiple write beams 128 and autofocus beam 132 to ensure proper alignment of the multiple beams within the multi-beam illumination beam 104. The polarization of the read beam 130 is changed by forty-five degrees by passing the beam through a quarter-wave plate 208.

Referring again to FIGS. 1, 2, 5C and 5D, the rectangular pattern 206 of the read beam 130 is scanned by the rotating lens wheel 112 along the length of a data trace 182 to be modulated by the data marks 196 of the multiple data tracks 194 (channels) therein. The multi-channel modulated read beam 130 is reflected by the media 108 back through the rotating lens wheel 112 and scanning transmissive polygon 110 of the read-write head 106 to the read sub-module 138 of the read-write module 102. As shown in FIG. 8, the polarization of the modulated read beam 130 is rotated an additional forty-five degrees (for a total of ninety degrees and a change, for example, from s- to p-polarization) by the quarter-wave plate 208. The modulated read beam 130 is then reflected by a polarization beam splitter 210 and imaged on a linear photodiode array 212 by a magnification system 214. The linear photodiode array 212 preferably comprises a plurality of avalanche photodiodes or PIN photodiodes that produce electrical signals in accordance with the multi-channel modulation of the read beam 130 to recover each channel (data track 194) of data scanned within each data trace 182. The multiple channels of data are then reassembled in proper order to recover the data signal.

Figure 9:
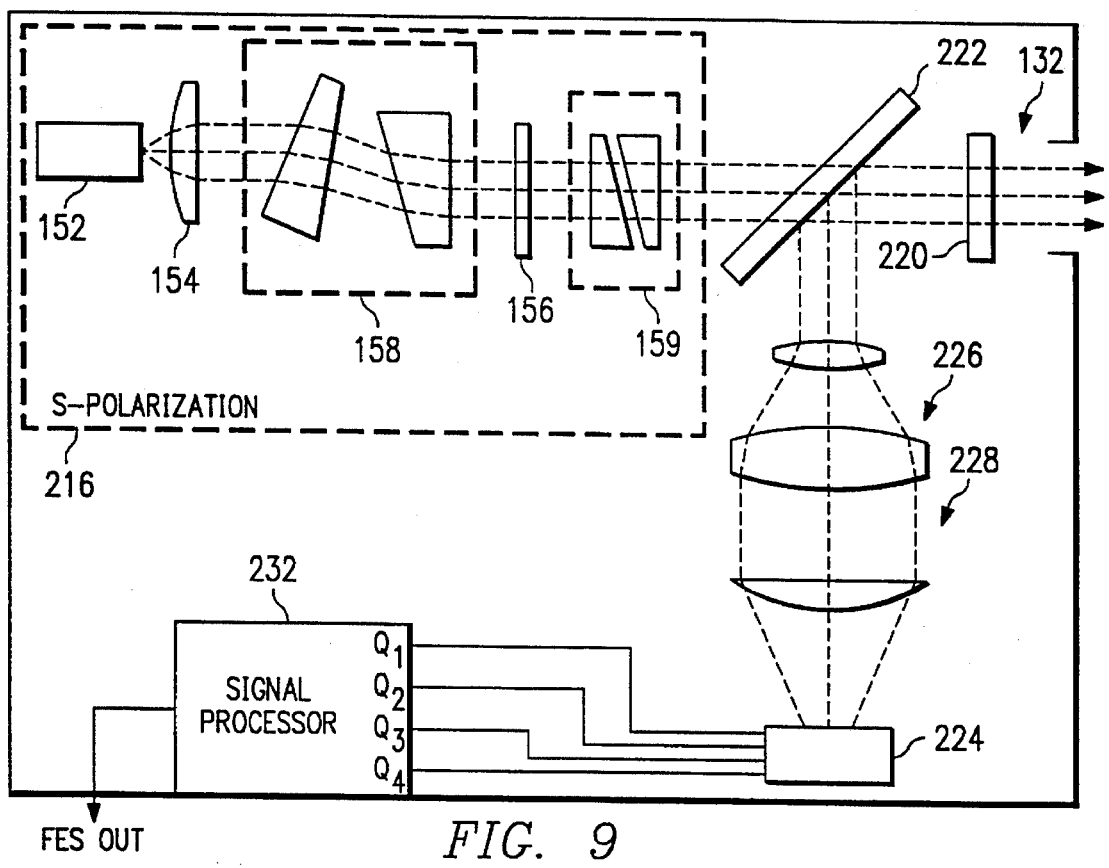
FIG. 9 is a schematic diagram of the autofocus beam source and autofocus error detector for the read-write module shown in FIG. 2.

Referring now to FIG. 9, there is shown a schematic view of the autofocus sub-module 140 within the read-write module 102. The autofocus sub-module includes an autofocus source 216 (similar to the write source 134 shown in FIG. 3A) for outputting a collimated autofocus beam 132. The autofocus source 216 includes an anamorphic prism pair 158, a displacement plate 156 and a risley prism pair 159 for shaping, translating and pointing the autofocus beam 132 output by a laser diode 152 and collimated by a lens 154. The pointing and translating optics of the autofocus source 216 shape the autofocus beam 132 for focusing to a spot 218 (see FIG. 5C) on the media 108. The pointing and translating optics further function to accurately position and orient the autofocus beam 132 with respect to the multiple write beams 128 and read beam 130 to ensure proper alignment of the multiple beams within the multi-beam illumination beam 104 as focused on the recording media 108. The autofocus beam 132 is passed through a quarter-wave plate 220 to change the polarization of the autofocus beam by forty-five degrees.

Referring again to FIGS. 1, 2 and 5C, the autofocus beam 132 is scanned by the rotating lens wheel across the recording media 108. The autofocus beam 132 is reflected by the media 108 back through the rotating lens wheel 112 and scanning transmissive polygon 110 of the read-write head 106 to the autofocus sub-module 140. As shown in FIG. 9, the polarization of the autofocus beam 132 is rotated by the quarter-wave plate 220 an additional forty-five degrees (for a total of ninety degrees and a change, for example, from s- to p-polarization). The autofocus beam 132 is then reflected by a polarization beam splitter 222 and focused to a spot on a quadrant detector 224 by a magnification system 226 and an astigmatic lens 228. The quadrant detector 224 produces a plurality of electrical signals in accordance with the shape of the spot focused thereon by the astigmatic lens 228. Variations in the shape of the focused spot detected by the quadrant detector 224 can be used for a variety of feedback functions including determining the focus of the multi-beam illumination beam 104 on the recording media 108.

Many autofocus techniques may be employed. For example, referring to FIG. 10, there is shown a geometry utilizing the autofocus detection system shown in FIG. 9 to detect focusing errors. The distance "D" represents the distance between the write lens 176 of the lens wheel 112 and the astigmatic lens 228 The distance "$f_0$" represents the focal length of the lens 176 on the lens wheel 112. The distances "$f_1$" and "$f_2$" represent the focal lengths of the astigmatic lens 228. The distance "d" represents the distance between the astigmatic lens 228 and the quadrant detector 224 and is given by the following equation:

$$d = 2(f_1)(f_2)/(f_1 + f_2).$$

If the distance d is set according to the above equation, then the astigmatic lens 228 focuses a circular illumination spot on the quadrant detector 224 for the reflected autofocus beam 132 when the error distance "err" between the recording media 108 and the focal plane of the write lens 176 is zero (i.e., the autofocus beam is focused on the media). When the autofocus beam is not focused on the recording media 108, the error distance err is non-zero and the astigmatic lens 228 focuses an elliptical illumination spot on the quadrant detector 224.

Each quadrant 230(1)–230(4) of the detector 224 outputs a corresponding signal (Q1–Q4) proportional to the intensity of the light from the reflected autofocus beam 132 focused thereon by the astigmatic lens 228. The signals Q1–Q4 may be used to determine a focus error signal (FES) indicative of whether the multi-beam illumination beam 104 is properly focused on the media 108. The FES is determined in accordance with the following equation:

$$FES = [(Q1 + Q3) - (Q2 + Q4)]/[Q1 + Q2 + Q3 + Q4].$$

The FES is output from a signal processor 232 implementing the above equation to control the adjustment of the read-write head 106 in a manner to be described to focus the multi-beam illumination beam on the recording media 108.

When the error distance "err" is positive (i.e., the distance between the media 108 and the write lens 176 is greater than $f_0$), the vertical diameter of the elliptical illumination spot across quadrants 230(2) and 230(4) is greater than the horizontal diameter across quadrants 230(1) and 230(3). Thus, the signals Q2 and Q4 will be greater than the signals Q1 and Q3. The FES determined by the above stated equation will therefore be negative. The opposite is true when the distance between the media 108 and the write lens 176 is less than $f_0$. If the error distance "err" is zero (i.e., the multi-beam illumination beam 104 is focused on the media 108), the illumination spot on the quadrant detector 224 will be circular and the signals Q1–Q4 will be substantially equal to each other (because the vertical and horizontal diameters of the spot are equal) resulting in an FES substantially equal to zero.

Figure 11B:
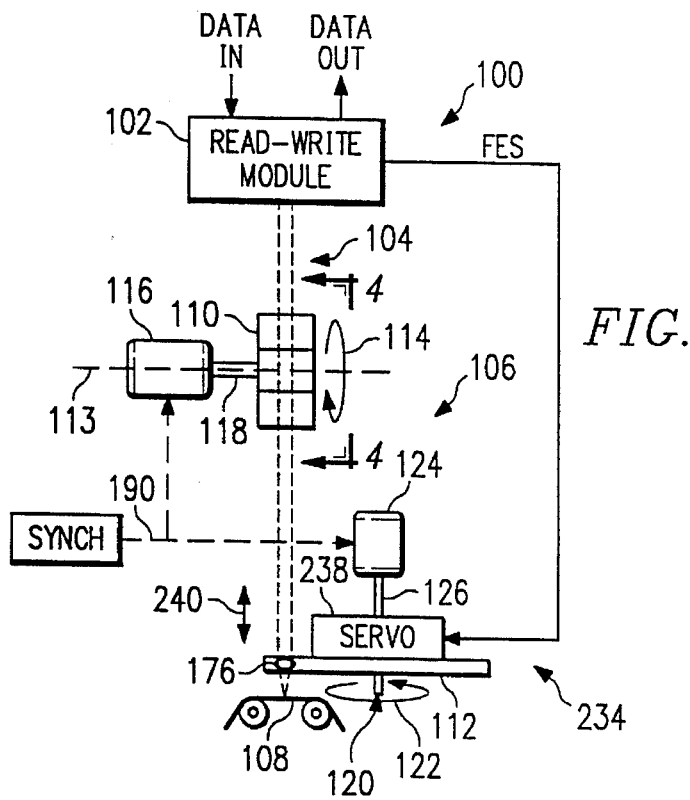
FIG. 11B illustrates another embodiment of the optics for the autofocus system included in the optical tape recorder of FIG. 1.
Figure 11C:
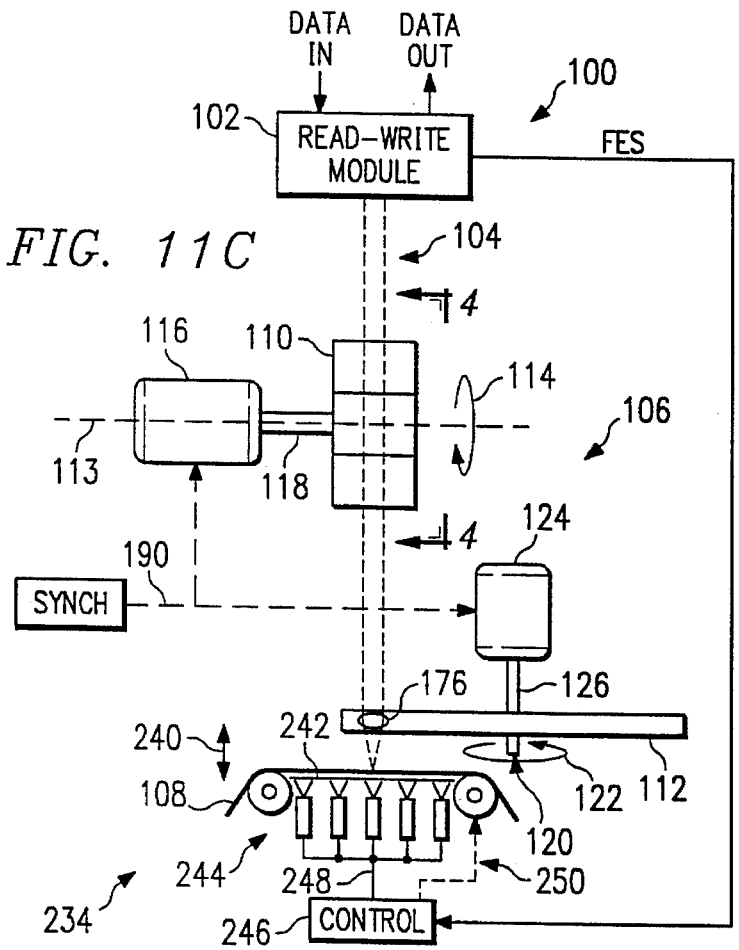
FIG. 11C illustrates still another embodiment of the optics for the autofocus system included in the optical tape recorder of FIG. 1.

Reference is now made to FIGS. 11A–11C wherein there are shown several embodiments for the autofocus error correction system 234 in the read-write head 106 for the optical recorder 100. The embodiments of FIGS. 11A and 11B illustrate lens translation methods for providing autofocus error correction. The embodiment of FIG. 11C illustrates a media translation method for providing autofocus error correction. The translation of either lens or media for the error correction system of each embodiment is controlled by the sign (either positive or negative) of the focus error signal (FES) generated by the processor 232 according to the equation above in response to the signals Q1–Q4 output by the quadrant detector 224 (see FIGS. 9 and 10).

In the embodiment for the autofocus error correction system 234 illustrated in FIG. 11A, a pair of autofocus lenses 236 are positioned in line with the multi-beam illumination beam 104, including the multiple write, read and autofocus beams, between the read-write module 102 and the scanning transmissive polygon 110. A servomotor 238 adjusts (translates) the position of a first one of the autofocus lenses (lens 236a), back and forth in the direction indicated by the two-headed arrow 140, along the path of the multi-beam illumination beam 104. The translation of the autofocus lens 236a by the servomotor 238 is controlled by the sign of the focus error signal output from the autofocus sub-module 140 of the read-write module 102 such that the focus of the multi-beam illumination beam 104 occurs at the recording media 108. One drawback experienced with this autofocus method is the difficulty in designing the fixed autofocus lens 236b and write lens 176 to correct for the varying amounts of spherical aberration produced by translation of the autofocus lens 236a.

One way to avoid the spherical aberration drawbacks encountered with the embodiment of FIG. 11A is to translate each write lens 176 on the rotating lens wheel 112, as shown in the embodiment illustrated in FIG. 11B. The servomotor 238 is mounted on the lens wheel 112 and connected to translate each write lens 176 back and forth in the directions indicated by the two-headed arrow 240 for focusing the multi-beam illumination beam 104 on the recording media 108. Translation of the write lens 176 occurs within the structure of the lens wheel disk in response to the sign of the focus error signal (FES) received from the autofocus sub-module 140 of the read-write module 102. This technique, however, is not preferred due to the increased complexity of the servomotor and lens wheel 112 required for translating each individual lens in the lens wheel.

An alternate means for avoiding both the spherical aberration servomotor actuation drawbacks described above is to translate the recording media 108 as illustrated in the embodiment of FIG. 11C. An air plate 242 is positioned under the moving recording media 108 on the opposite side from the rotating lens wheel 112. Movement of the recording media 108 back and forth in the directions indicated by the two-headed arrow 240 is effectuated by an array of air nozzles 244 expelling air through the air plate 242 against the underside of the media. The amount of movement for the media 108 along arrow 140 is controlled not only by the amount of air expelled by the air nozzles 244, but also by the amount of tension applied to the media 108 while passing over the air plate 242. A control circuit 246 responsive to the sign of the FES output by the autofocus sub-module 140 adjusts the amount of air expelled via control line 248 and further adjusts the tension on the media 108, as generally indicated at 250, to properly position the media for focusing the multi-beam illumination beam 104.

Although several embodiments of the optical tape recorder of the present invention have been described in the foregoing Detailed Description and illustrated in the accompanying Drawings, it will be understood that the invention is not limited to the embodiments disclosed, but is capable of numerous rearrangements, substitutions and modifications without departing from the spirit of the invention.

We claim:

1. Apparatus for optically recording and reading a data signal within a plurality of data tracks of a light sensitive recording media comprising:

first light source means for emitting a plurality of write beams;

means for modulating each write beam by a designated portion of the data signal to generate a plurality of data signal modulated write beams;

a second light source means for emitting a read beam; and a plurality of reflector panes in a layered configuration and a single pane reflective mirror, each reflector pane and said mirror having a preselected angle of reflection to deflect and spatially combine the plurality of data signal modulated write beams and the read beam into a collimated multi-channel light beam.

2. The apparatus for optically recording and reading as in claim 1 wherein the first light source means comprises a plurality of laser light emitting diodes emitting light having a predetermined frequency each having a lens for collimating the emitted light into a write beam and the second light source means comprises a laser light emitting diode emitting light having the predetermined frequency and having a lens for collimating the emitted light into the read beam.

3. The apparatus for optically recording and reading as in claim 1 further comprising:

means for shaping the read beam to illuminate on the recording media a plurality of recorded data tracks within a data trace recording the data signal, the read beam modulated by data marks within the plurality of data tracks to generate a data modulated multi-channel read beam; and means for detecting the multiple channels of the modulated multi-channel read beam to recover the recorded data signal.

4. The apparatus for optically recording and reading as in claim 3 wherein the second light source means comprises a laser light emitting diode and a lens for collimating the emitted light into the read beam.

5. Apparatus for optically recording information on a recording media, comprising:

a plurality of light source means, each outputting a write beam channel;

means for modulating each write beam channel by a predetermined portion of the information signal;

means for spatially combining the individual write beam channel output by each of the plurality of light source means into a collimated multi-channel light beam;

a rotating lens wheel having a plurality of circumferentially positioned lenses for receiving and focusing the collimated multi-channel light beam on a surface of the recording media, each lens successively following an arcuate path through an active area, said arcuate path traced by a portion of a circular path followed by each lens as the lens wheel rotates;

means for scanning the collimated multi-channel light beam, such that the beam scans along a linear path substantially aligned with and corresponding to the arcuate path followed by lenses in the rotating lens wheel; and means for synchronizing the scanning of the collimated multi-channel light beam with the rotation of the lens wheel such that the movement of each scan of the beam along the linear path coincides with the movement of each successive lens along the arcuate path.

6. The apparatus for optically recording information as in claim 5 wherein each light source means further comprises:

a laser emitting light of a predetermined frequency and intensity for creating a mark on the recording media;

means for forming the laser emitted light into a write beam channel.

7. The apparatus for optically recording information as in claim 5 further comprising a means for rotating the lens wheel about an axis so that each lens momentarily receives and focuses the collimated multi-channel light beam to scan a plurality of data tracks across the recording media in each data trace, each data track corresponding to one of the plurality of write beam channels within the collimated multi-channel light beam.

8. The apparatus for optically recording information as in claim 5 wherein the means for scanning comprises:

a transmissive polygon having an axis of rotation and a plurality of opposed pairs of sides for refracting and displacing in a parallel manner the collimated multi-channel light beam incident on and transmitted through the polygon; and drive means for rotating the polygon about the axis of rotation and causing the through transmitted and displaced collimated multi-channel light beam to be refracted and displaced by the opposed pairs of sides and thereby repeatedly scan along the recording media.

9. The apparatus for optically recording information as in claim 5 further comprising:

light source means for outputting an autofocus beam channel to be spatially combined with the plurality of write beam channels into the collimated multi-channel light beam, the autofocus beam channel focused on and scanned across the media and reflected thereby;

means for focusing the reflected autofocus beam to a spot;

detector means for detecting the shape of the focused spot; and means for determining from the detected shape of the focused spot whether the collimated multi-channel light beam is properly focused on the recording media and outputting a signal indicative thereof.

10. The apparatus for optically recording information as in claim 9 further comprising:

autofocusing means responsive to the signal output by the means for determining for adjusting the focus of the collimated multi-channel light beam on the recording media.

11. The apparatus for optically recording information as in claim 5 wherein the collimated multi-channel light beam further includes a single read beam channel and further comprises:

a light source means for outputting the single read beam channel to be spatially combined with the plurality of write beam channels into the collimated multi-channel light beam, the single read beam channel focused on and scanned across the recording media along each data trace and across each of the plurality of data tracks within the data trace by the means for scanning, said single read beam further being modulated by data marks stored in the plurality of data tracks within each scanned data trace and reflected therefrom; and an arrayed photo detector for demodulating the modulated and reflected read beam channel to recover the information signal from plurality data tracks of recorded data in each data trace.

12. The apparatus for optically recording information as in claim 11 wherein the light source means for the single read beam channel comprises:

a laser source emitting light of a predetermined frequency and intensity for illuminating the recording media;

means for forming the emitted light into a single read beam channel; and means for shaping the single read beam channel to illuminate a rectangular area on the recording media across the plurality of data tracks within each scanned data trace.

13. Apparatus for optically recording a data signal on a recording media, comprising:

first light source means outputting a plurality of write beams each modulated by a designated portion of a data signal;

means for spatially combining each of the plurality of data signal modulated write beams into a collimated multi-beam light beam;

means for scanning the collimated multi-beam light beam such that the beam repetitively scans across an active area along a linear first path from a first point to a second point;

means for focusing the collimated multi-beam light beam on a recording media;

means for repetitively translating the means for focusing across the active area along an arcuate second path from a third point to a fourth point, wherein the first and second paths are substantially aligned with each other; and means for synchronizing each scan of the collimated multi-beam light beam along the first path to coincide with each translation of the means for focusing along the second path to focus and trace the collimated multi-beam light beam across the recording media along a data trace, each write beam of the collimated multi-beam light beam recording a separate data track within each data trace.

14. The apparatus for optically recording as in claim 13 wherein the first light source means comprises:

a plurality of lasers each emitting light having a predetermined frequency and intensity for marking the recording media:

means for forming the light emitted from each laser into a separate write beam;

means for pointing and translating each write beam with respect to the plurality of other write beams within the multi-channel light beam to position each write beam to record separated data tracks within each data trace scanned across the recording media.

15. The apparatus for optically recording as in claim 13 wherein the means for scanning comprises:

a transmissive polygon having an axis of rotation and a plurality of opposed pairs of sides for refracting and displacing the multi-beam light beam as transmitted through the polygon; and drive means for rotating the polygon about the axis of rotation thereby causing the through transmitted multi-beam light beam to repeatedly scan along the linear first path.

16. The apparatus for optically recording as in claim 13 wherein the means for focusing the collimated multi-beam light beam comprises a plurality of lenses.

17. The apparatus for optically recording as in claim 16 wherein the means for repetitively translating the means for focusing comprises:

a lens wheel having a disk shape wherein the plurality of lenses are positioned with equal spacing about the circumference of the disk; and means for rotating the lens wheel about an axis so that each lens momentarily moves through the active area along the arcuate second path to focus and scan the collimated multi-beam light beam across the recording media along a data trace.

18. The apparatus for optically recording as in claim 13 further including:

second light source means outputting a single read beam that is combined with the plurality of write beams into the collimated multi-beam light beam by the means for spatially combining, the single read beam moved to scan across the recording media to illuminate the plurality of data tracks within each recorded data trace, the read beam modulated by data marks within the plurality of data tracks to generate a modulated, multi-channel read beam, each channel within the single read beam corresponding to a data track within each data trace; and means for detecting the modulated, multi-channel read beam and generating an output data signal corresponding thereto to recover the recorded data signal.

19. The apparatus for optically recording as in claim 18 wherein the second light source means comprises:

a laster emitting light having a predetermined frequency and intensity for illuminating the recording media;

means for forming the emitted light into a single read beam;

means for shaping the single read beam to illuminate across the plurality of data tracks within a data trace; and means for pointing and translating the single read beam with respect to the plurality of write beams to position and separate the read beam within the collimated multi-beam light beam.

20. The apparatus for optically recording as in claim 13 further including autofocus means comprising:

third light source means outputting an autofocus beam that is combined with the plurality of write beams to form the collimated multi-beam light beam by the means for spatially combining, wherein the autofocus beam is traced across the recording media and reflected therefrom;

means for focusing the reflected autofocus beam to a spot on a detector having means for identifying the shape of the spot of the reflected autofocus beams; and means for determining from the identified shape of the spot whether the collimated multi-beam light beam is properly focused on the recording media and outputting an autofocus control signal indicative thereof.

21. Apparatus for optically recording data on and recovering data from a recording media sensitive to light, comprising:

a plurality of first light sources outputting a corresponding plurality of modulated write beams, each write beam modulated by a designated portion of a data signal;

a second light source outputting a read beam;

means for combining the modulated write beams output by the plurality of first light sources and the read beam output by the second light source into a collimated multi-beam illumination beam;

a transmissive polygon having a first axis of rotation and a plurality of opposed pairs of sides for refracting and displacing the collimated multi-beam illumination beam as transmitted through the polygon, said transmissive polygon comprising transparent optical quality material;

drive means for rotating the polygon about the first axis of rotation thereby causing the through transmitted collimated multi-beam illumination beam to repetitively scan along a linear first path from a first point to a second point across an active area;

a lens wheel having a disk shape and a plurality of lenses positioned with equal spacing about the circumference of the disk;

means for rotating the lens wheel about a second axis so that each lens momentarily moves through the active area along an arcuate second path from a third point to a fourth point, wherein the first and second paths are substantially aligned with each other;

means for synchronizing each scan of the collimated multi-beam illumination beam along the linear first path to coincide with each translation of a lens along the arcuate second path so that the collimated multi-beam illumination beam is focused by successive lenses to scan successive data traces across the recording media, wherein the plurality of write beams record data marks within a corresponding plurality of data tracks within each data trace, and the read beam illuminates a recorded plurality of data tracks within each data trace with the data marks within the plurality of data tracks modulating the read beam to generate a modulated read beam; and means for detecting the modulated read beam and generating an output data signal corresponding thereto to recover the recorded data signal from the plurality of recorded data channels.

22. The apparatus for recording and recovering data as in claim 21 wherein each first light source comprises:

a laser source emitting light having a predetermined intensity, the emitted light frequency modulated by a predetermined portion of the data signal;

means for forming the emitted modulated light into a modulated write beam.

23. The apparatus for recording and recovering data as in claim 21 wherein the second light source comprises:

a laser source emitting light having a predetermined intensity;

means for forming the emitted light into a read beam; and means for shaping the read beam to illuminate an area on the recording media as the read beam scans along a data trace to read each data tracks therein.

24. The apparatus for optically recording as in claim 21 further including autofocus means comprising:

a third light source emitting an autofocus beam combined with the plurality of write beams and the read beam to form the collimated multi-beam illumination beam, the autofocus beam traced across the recording media and reflected therefrom;

a quadrant detector wherein each quadrant measures the intensity of the light focused thereon;

an astigmatic lens for focusing the reflected autofocus beam to a spot on the quadrant detector;

means for comparing the light intensity measured by each quadrant of the detector to identify the shape of the spot focused on the quadrant detector;

means for determining from the identified shape whether the illumination beam is properly focused on the recordng media, the spot having a circular shape if the illumination beam is properly focused on the media, and having an elliptical shape if the illumination beam is not properly focused, and outputting an autofocus control signal indicative thereof; and means for adjusting the focus of the collimated multi-beam illumination beam on the recording media in response to the autofocus control signal.

* * * * *